(12) United States Patent
Chen (10) Patent No.: US 9,189,281 B2
(45) Date of Patent: Nov. 17, 2015

(54) APPARATUS, SYSTEM AND METHOD FOR PROVIDING FAIRNESS IN TASK SERVICING (71) Applicant: Oracle International Corporation, Redwood City, CA (US)

(72) Inventor: Michael Suiping Chen, Cupertino, CA (US)

(73) Assignee: Oracle International Corporation, Redwood City, CA (US)

( * ) Notice: Subject to any disclaimer, the term of this patent is extended or adjusted under 35 U.S.C. 154(b) by 445 days.

(21) Appl. No.: 13/655,218

(22) Filed: Oct. 18, 2012

(65) Prior Publication Data

US 2014/0115591 A1   Apr. 24, 2014

(51) Int. Cl.
*G06F 9/46*   (2006.01)
*G06F 9/50*   (2006.01)

(52) U.S. Cl.
CPC ...... *G06F 9/5027* (2013.01); *G06F 2209/5011* (2013.01); *G06F 2209/5018* (2013.01)

(58) Field of Classification Search
CPC .................................................. G06F 9/4881
USPC ....................................................... 718/102
See application file for complete search history.

(56) References Cited

U.S. PATENT DOCUMENTS

| | | | | |
|---|---|---|---|---|
| 2002/0178282 A1* | 11/2002 | Mysore et al. | | 709/234 |
| 2004/0034807 A1* | 2/2004 | Rostowfske | | 714/4 |
| 2008/0147893 A1* | 6/2008 | Marripudi et al. | | 710/5 |
| 2008/0313637 A1* | 12/2008 | Youn et al. | | 718/102 |
| 2010/0082856 A1* | 4/2010 | Kimoto et al. | | 710/45 |
| 2010/0202294 A1* | 8/2010 | Mullendore et al. | | 370/235 |
| 2010/0250785 A1* | 9/2010 | Shin et al. | | 710/3 |
| 2011/0158254 A1* | 6/2011 | Basso et al. | | 370/468 |

OTHER PUBLICATIONS

Eduardo Pinheiro, Ricardo Bianchini, Enrique V. Carrera, and Taliver Heath, Load Balancing and Unbalancing for Power and Performance in Cluster-Based Systems, 2001, Workshop on compilers.*

* cited by examiner

*Primary Examiner* — Emerson Puente
*Assistant Examiner* — Charlie Sun
(74) *Attorney, Agent, or Firm* — Polsinelli PC (57) ABSTRACT A storage system that is configured to fairly service requests from different host systems particularly in congested situations. To balance the processing of tasks between different clients, the system sorts tasks received from different clients into task lists. In particular, the system sorts the incoming tasks based on the ITL (Initiator, Target, LU) nexus information associated with each task. In some instances, a new task list is created for each ITL nexus. The sorting of tasks may provide for a more even distribution of tasks and thus a more fair processing of tasks. More specifically, because tasks from each list are processed in round-robin fashion, tasks arriving from even the slowest clients are given a substantially equal chance of being processed as the tasks arriving from the faster clients.

23 Claims, 8 Drawing Sheets

APPARATUS, SYSTEM AND METHOD FOR PROVIDING FAIRNESS IN TASK SERVICING

TECHNICAL FIELD

Aspects of the present disclosure relate generally to a storage area network (SAN), and in particular, to a method and system for fairly processing tasks from different client devices interacting with the SAN.

BACKGROUND

The explosion of the Internet, enterprise computing, cloud computing, content delivery over networks, and other computing and networking capabilities has been accompanied by like explosions in data storage solutions as these various computing capabilities require and take advantage of ever increasing amounts of stored data. One type of storage solution is referred to as a storage area network or "SAN." Generally speaking, a SAN is a network that provides a server access to data storage such as hard disk drives and other disk arrays, tape storage, and other forms of memory and storage. A SAN primarily provides access to storage devices that are generally not accessible through other types of networks, such as local area networks.

The small computer system interface (SCSI) is a protocol that provides a set of standards for connecting and transferring data between a host computer and peripheral devices in SAN environments. In the parlance of an SCSI SAN, the SAN includes an initiator host and a target device. The host, also known as a client, typically includes at least one initiator. The target device, which could be a storage array, typically includes at least one target port and at least one logical unit. At a high level, the client initiates a request to the target device through an SCSI command, and the target device provides the necessary input and output commands to the storage to service the request. Thus, the communication between the initiator (I) and the target (T) through an SCSI interface involves sending requests from an initiator to a target which then responds to the request by issuing I/O operations to the logical unit (LU). In general, the logical unit can be either a physical device such as a tape drive, disk drive, etc. or a processing agent that implements functionality of the logical unit.

Because in a typical computing environment multiple host systems may communicate with one or more target devices, a controller may be used to process requests from the various host systems. In particular, the controller may be used to manage access to target devices through one or more logical paths. The controller, for example, may utilize information for each possible connection comprising an initiator (host port), target (storage controller port) and storage device logical unit, such as ITL (initiator, target, LU) nexus information to facilitate processing of received requests. In particular, the combination of the initiator port, target port and logical unit information helps define a path along which a storage device may be accessed.

The SCSI tasks arriving from different hosts are typically processed on a target device on a first-come-first-serve (FIFS) basis with neither fairness nor prioritization being given to any of the tasks. Thus, in some instances, such as when numerous hosts or initiators direct a large number of requests toward a storage array or target device, and the array is not able to immediately process all the requests, congested situations may arise causing the system to slow in its ability to handle the requests. In such cases, the arriving requests are queued until the resources become available to service the queued requests. The use of FIFS in congested situations is especially unfair when the system includes slow clients, as the requests from faster machines are served more frequently. In particular, because requests from faster machines arrive at the target device at a faster rate, more requests from faster clients are processed at the target devices as compared to the requests arriving from the slower clients. This uneven sharing of the execution resources often leads to reduced I/O performance on the slower machines.

Thus, in order to more equally process tasks from all hosts regardless of their speed, there is a need for a system that provides fairness among all active SCSI ITS nexus during congested situations. In particular, there is a need for a system that is capable of allocating a fair share of execution resources to all of the machines/initiators regardless of their speed when resources are contended. It is with respect to these and other considerations that embodiments of the present disclosure have been made.

SUMMARY

One aspect of the present disclosure involves a system for processing tasks, where the system includes a host system including a plurality of initiator devices. Each of the plurality of the initiator devices includes at least one processor operable to generate a plurality of tasks. The system further includes a storage array including at least one target port and at least one logical unit. The target system further includes at least one second processor operable to receive the plurality of tasks where the at least second processor is operable to sort the plurality of tasks into a number of task lists. Each task list is associated with a specific Initiator, Target, Logical Unit (ITL) nexus. The target system is further operable to process a task from each of the plurality of task lists prior to processing another task from any of the plurality of task lists such that tasks being processed may arrive at the target device nonsequentially.

Aspects of the present disclosure may also involve a method of processing tasks on a target device. The method includes the operation of receiving a plurality of tasks from a plurality of initiator devices and sorting the received tasks into a plurality of task lists at a target device. Each task list is associated with an Initiator, Target, Logical Unit (ITL) nexus. Finally the method also involves the operation of processing a leading task from each of the plurality of task lists prior to processing another task from any of the plurality of task lists such that the leading tasks being processed may arrive at the target device nonsequentially.

BRIEF DESCRIPTION OF THE DRAWINGS

Exemplary embodiments are illustrated in referenced figures of the drawings. It is intended that the embodiments and figures disclosed herein are to be considered illustrative rather than limiting. The use of the same reference numerals in different drawings indicates similar or identical items.

FIG. 4 is an exemplary flow diagram depicting task processing at a target device according to one embodiment.

DETAILED DESCRIPTION

Aspects of the present disclosure involve a SAN storage system that is configured to fairly service requests from different host systems particularly in congested situations, and related apparatus, systems and methods. In one particular aspect, the disclosure is directed to processing of SCSI tasks in SCSI target devices. To balance the processing of tasks between different clients, the systems and methods discussed herein may involve sorting tasks received from different clients into task lists. In particular, the system sorts the incoming tasks based on the ITL (Initiator, Target, LU) nexus information associated with each task. In some instances, a new task list is created for each ITL nexus. The sorting of tasks may provide for a more even distribution of tasks and thus a more fair processing of tasks. More specifically, because tasks from each list are processed in round-robin fashion, tasks arriving from even the slowest clients are given a substantially equal chance of being processed as the tasks arriving from the faster clients.

In the disclosed system, sorted tasks may be processed by having available task workers, also referred to as "worker threads," pull and process separate tasks from each task list. In particular, a pool of generic task workers may be used for processing tasks in a global run-queue, with none of the task workers being dedicated to any of the specific task lists. More specifically, after task lists are pushed and chained in a centralized, global run-queue, any of the available task workers can pull and process tasks from any of the task lists in a round-robin fashion. Thus, for example, a leading task from each of the task lists is processed by the dispatched task workers prior to processing any of the following tasks in any of the lists. Because worker threads serve tasks in each ITL list equally, this type of processing leads to each client, regardless of its speed, having a fair share of the execution resources. In other words, tasks from the faster clients that arrive prior to the tasks from the slower clients are not unfairly prioritized.

Processing of tasks in the manner described above and especially by allowing generic task workers to pull tasks from the task lists linked in a global run-queue provides several advantages. First, all tasks received at the target device have a fair chance of being processed regardless of the host speed. Second and similar to the first, the fairness scheme provided reduces task access latency especially for task requests from slower hosts. Also, task request response time can be improved as compared to the conventional method of processing tasks. Finally, the efficient worker dispatching scheme and load balancing greatly improves efficiency of task processing and conserves processing resources by reducing context switch overhead and the overall kernel CPU usage. These and other advantages will be recognized from the discussions set out herein.

Figure 1:
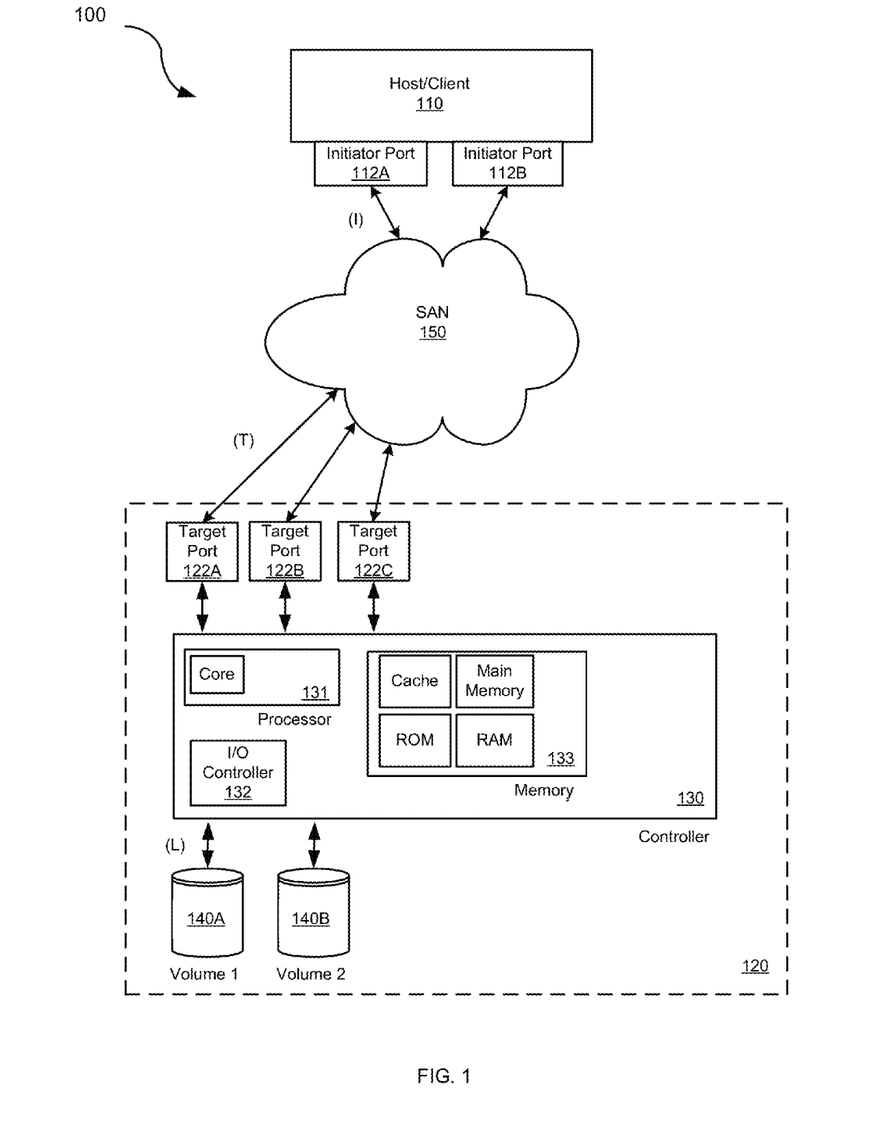
FIG. 1 is a schematic diagram illustrating an exemplary operating environment in accordance with one embodiment.

For a more detailed discussion of an exemplary operating environment that utilizes a fairness scheme for processing tasks on a SCSI target, reference is now made to FIG. 1. In general, a storage environment 100 includes host devices (initiator hosts) 110, a target device 120, and a storage area network (SAN) 150 over which requests from the initiator hosts are sent to a target device. In the example environment shown, the initiator host may further include at least one initiator port 112. The initiator host may be of any platform, such as for example, OpenSolaris, Solaris, Windows, Linux, VMware ESX, etc. The SAN is specially designed to handle storage communication, such as for example, a Fibre Channel fabric or iSCSI protocols, among others.

The target device 120, which can be a storage array, may further include at least one port 122, a controller 130 and at east one storage system 140 having at least one LU. The target device may be a server turned into a storage array, using, for example, a Common Multiprotocol SCSI Target (COMSTAR) software framework, with the SCSI Target Frame Work (STMF) serving as a controller that manages target storage devices. In general, as shown in FIG. 1, the ports of the target device are designed to receive SCSI commands from the initiator devices. As such, the ports implement the protocol for SCSI command transport, such as for example Fibre Channel (FC), iSCSI, SA, iSER, etc. The LUs that provide an area of usable storage capacity may include such SCSI devices as disk drives, tape drives, or logical disks as created on a SAN that execute the SCSI commands. Thus, although, both the ports and the logical units may be separate hardware devices, in a server based storage array as discussed herein the functionality of multiple ports and logical units may be implemented in a single hardware unit with appropriate applications.

The controller may further include a processor 131, I/O controller 132 and memory 133. The controller may manage and keep track of the target ports and LUs and manage mapping for Initiator, Target, LU (ITL) sessions. In other words, the controller may include a list of all possible ITL nexus combinations to facilitate storage access. The controller may also manage context and resources for SCSI command execution. In particular, the controller may manage processing of tasks received from the initiator devices by sending received requests to the LUs through the I/O controller interface.

As shown in FIG. 1, in one possible embodiment, the controller receives tasks from various initiator ports through a number of target ports. The received tasks are initially sorted into a number of task lists (run queues) based on the ITL nexus information associated with each incoming task. More specifically, a separate task list is created for each ITL nexus, with all tasks from the same ITL nexus (associated with a given ITL nexus) being queued under the task list of the ITL. According to one embodiment, all ITL tasks lists may be stored in an independent data structure, such as for example an ITL list, which keeps track of all the ITL task lists. Thus, for example, each time a task from a newly identified ITL nexus arrives at the target device, a new ITL task list may be added to the ITL list. Alternatively, tasks associated with an ITL task list that already exists in the ITL list, may be simply queued under the task list of the ITL. Once run-able tasks are staged for processing under the task list of the ITL, the task lists from the ITL list may be pushed and chained in a global run-queue ready for further processing.

Figure 2A:
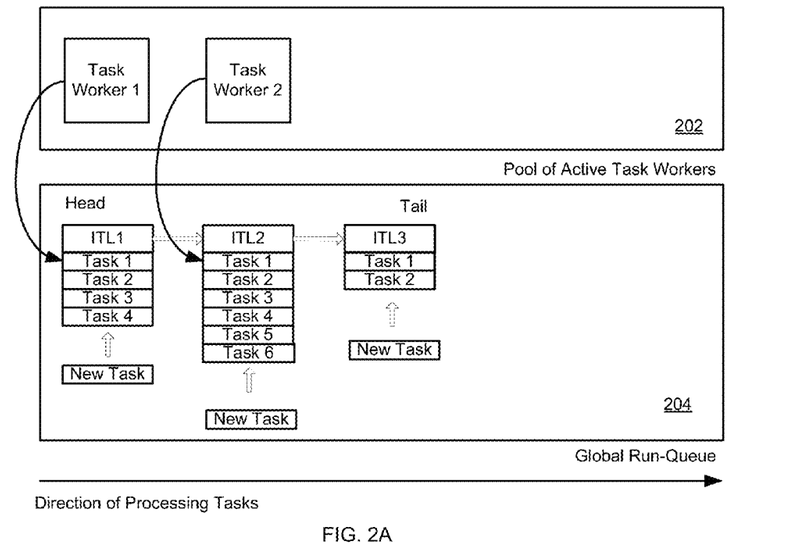
FIGS. 2A and 2B are diagrams depicting the processing of tasks in a global run queue where task workers process leading tasks from ITL lists using a round robin index, according to one embodiment.
Figure 2B:
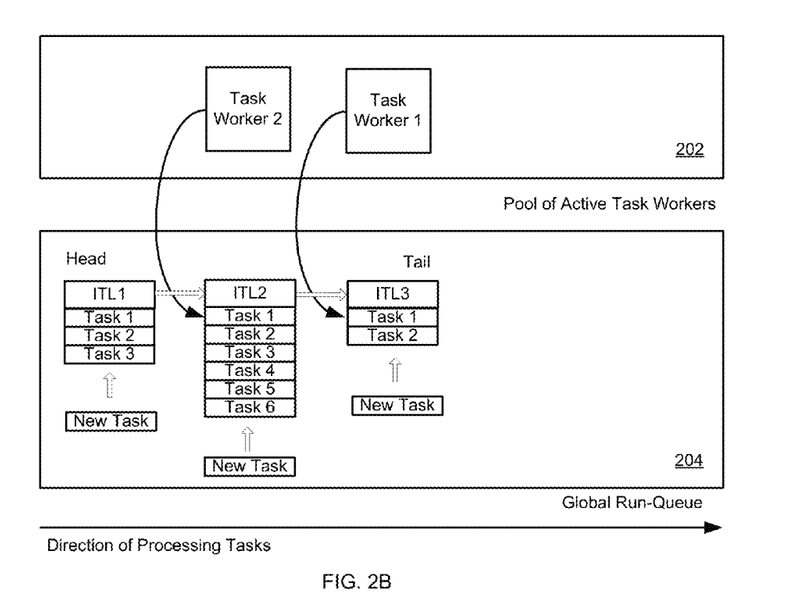

According to one embodiment, tasks in the global run-queue may be processed using a PULL model task processing method. In particular, as shown in FIG. 2, the PULL model relies on a pool of active generic task workers 202 to process tasks from any of the previously created ITL tasks lists. Because task workers in the pools are not tied or dedicated to any specific ITL task list, tasks in any of the ITL task lists can be processed by any of the available active task workers, resulting in each active ITL receiving a fair share of worker resources. More specifically, in the PULL model, once all of the ITL task lists are linked in a global run-queue and a centralized task pool is created 204, leading tasks from each of the ITL task lists are processed by one of the active task workers during each pass through the global run-queue. Stated differently, a leading task from each of the linked ITL lists is pulled and processed by any of the available task workers, and once the leading task in the ITL list is processed, the task worker pulls a leading task from the following ITL task list according to a round robin index that keeps track of the next task list from which a task is to be serviced. This pulling and servicing of the leading task lists continues until all tasks are processed and the task pool is exhausted.

Figure 3A:
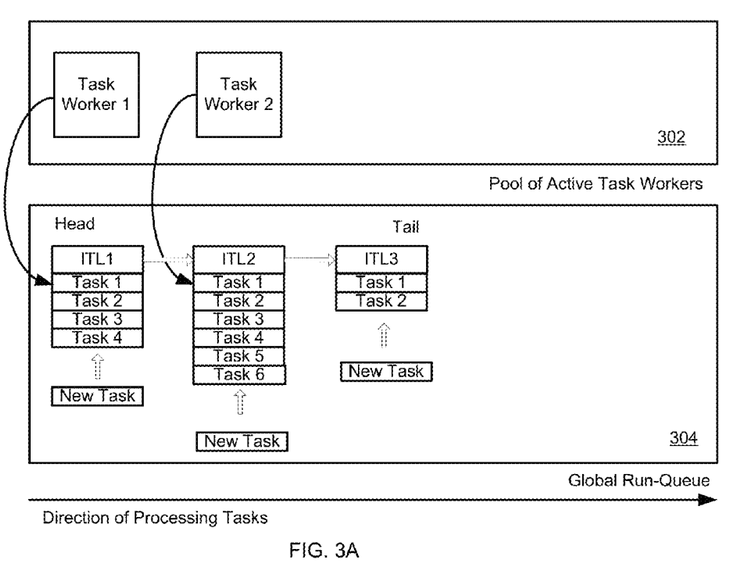
FIGS. 3A and 3B are diagrams depicting the processing of tasks in a global run queue where task workers process leading tasks from ITL lists using queue reorganization according to one embodiment.
Figure 3B:
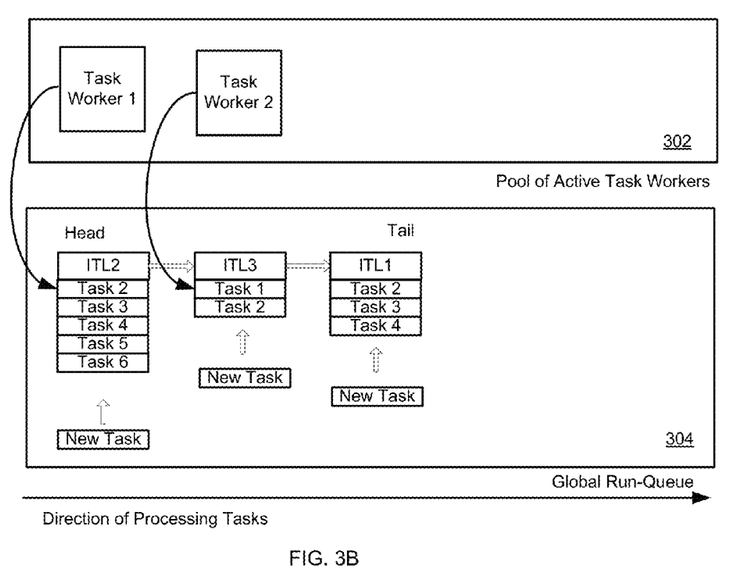

According to another embodiment, shown in FIG. 3, leading tasks in the global run-queue may be processed in a round-robin fashion without a round-robin index. In particular, as shown in FIG. 3A, once the leading task from a leading ITL task list is extracted and serviced, the leading ITL task list may be extracted and appended to the tail of the global run-queue as shown in FIG. 3B. With a new ITL task list at the head of the global run-queue, the leading task of the new leading ITL task list may be served by the next available task worker. The extracting and appending of the ITL task list to the tail of the global run-queue, both simplifies and makes task processing more efficient as the need for the round-robin index is eliminated. Similarly to the task processing method described above, tasks from the global run-queue are pulled and service by the generic task workers from the pool of the active task workers until all tasks are processed and the task pool is exhausted.

As discussed above, the PULL model relies on a pool of generic task workers to process tasks in the global run-queue. In particular the pool of active task workers includes task workers that were dispatched from a pool of all available task workers created at the system startup. According to one embodiment, the pool of available task workers may correspond to the number of cores available for processing tasks. For example, in a system that includes a processor with multiple cores, multiple task workers can be created and available for processing tasks. According to one embodiment, up to 64 task workers can be created to process tasks.

According to one embodiment, dispatching of task workers may be done on demand in order to reduce context switch overhead. In particular, the number of task workers to be dispatched for processing tasks and the time at which the workers are dispatched can be determined based on the depth of the global run-queue (total number of tasks present in the run-queue). In particular, new task workers can be dispatched each time a dispatch threshold is crossed when a new task is added to the global run-queue. More specifically, each time a new task is posted in the run-queue, the depth of the run-queue can be checked to determine if the threshold has been reached, with an additional worker being dispatched when the dispatch threshold is crossed. According to one embodiment, a new task workers can be dispatched when the queue depth is at least N*(M+1) tasks, with N representing a predetermined dispatch threshold, and M representing the number of active workers which are processing staged tasks at a given time.

In general, the dispatch threshold (N) can be determined from the time and latency related attributes, such as worker dispatch latency, task run time and task service latency. The dispatch threshold, can be tuned or changed as needed depending on the system requirements. According to one embodiment, the worker dispatch threshold can be determined from both the worker dispatch latency and the task run time. In particular, the worker dispatch threshold may be determined by dividing worker dispatch latency, which is period between the time the worker is dispatched until the time the worker service routine is entered, by the task run time, which represents the time it took for a worker to process a task. Because dispatching a new worker thread takes time, the dispatch threshold helps to ensure that an appropriate number of task workers are available for processing tasks staged in the run-queue and as such helps to minimize task service latency. Furthermore, the dispatch threshold helps to ensure that once a worker is up and running enough tasks are available for processing and empty runs that occur when no tasks are left in the run-queue are minimized. For example, the threshold is typically set low enough to ensure that task service latency is minimized but high enough to avoid empty runs in which the newly created task workers simply exit when no tasks remain in the queue for it to process.

Alternatively, the threshold value can be determined from the task service latency, which is the time that run-able task is staged in the run queue before it is picked up by any of the workers. In particular, the threshold value can be shown to be linearly proportional to the task service latency. According to one example, the use of a dispatch threshold of 3 has been shown to increase system performance.

Alternatively, according to yet another embodiment, in order to balance work load among workers, task workers may be dispatched to process each of the subsequent tasks on a round-robin basis. In other words, a pool of task workers may be generated with the idle task workers being selected for processing tasks in a round-robin fashion. Thus, instead of dispatching the leading idle task worker first to process tasks in the global run-queue, all task workers maybe chained together, for example, in a list and the next idle worker may be selected using a round-robin index.

Now discussion will turn to a method of using the disclosed system to process tasks at a target device. In particular, reference will be made to FIGS. 4 and 5 to explain task processing method according to the PULL model. As shown in FIG. 4, the following general steps might be executed to process tasks received from an initiator device on a target device. Initially, a number of cores available for processing tasks may be determined at system startup (step 401). Next, a number of task workers corresponding to the number of available cores can be created at the target device (step 402). Tasks arriving at the target device may then be sorted into tasks list corresponding to an ITL nexus associated with the tasks (step 403). Once all tasks are queued into their corresponding task list, all tasks lists may be pushed to a global run-queue (step 405) in order to be processed. According to one embodiment, task workers for processing tasks staged in the global run-queue may be dispatched on demand (step 405).

Figure 5:
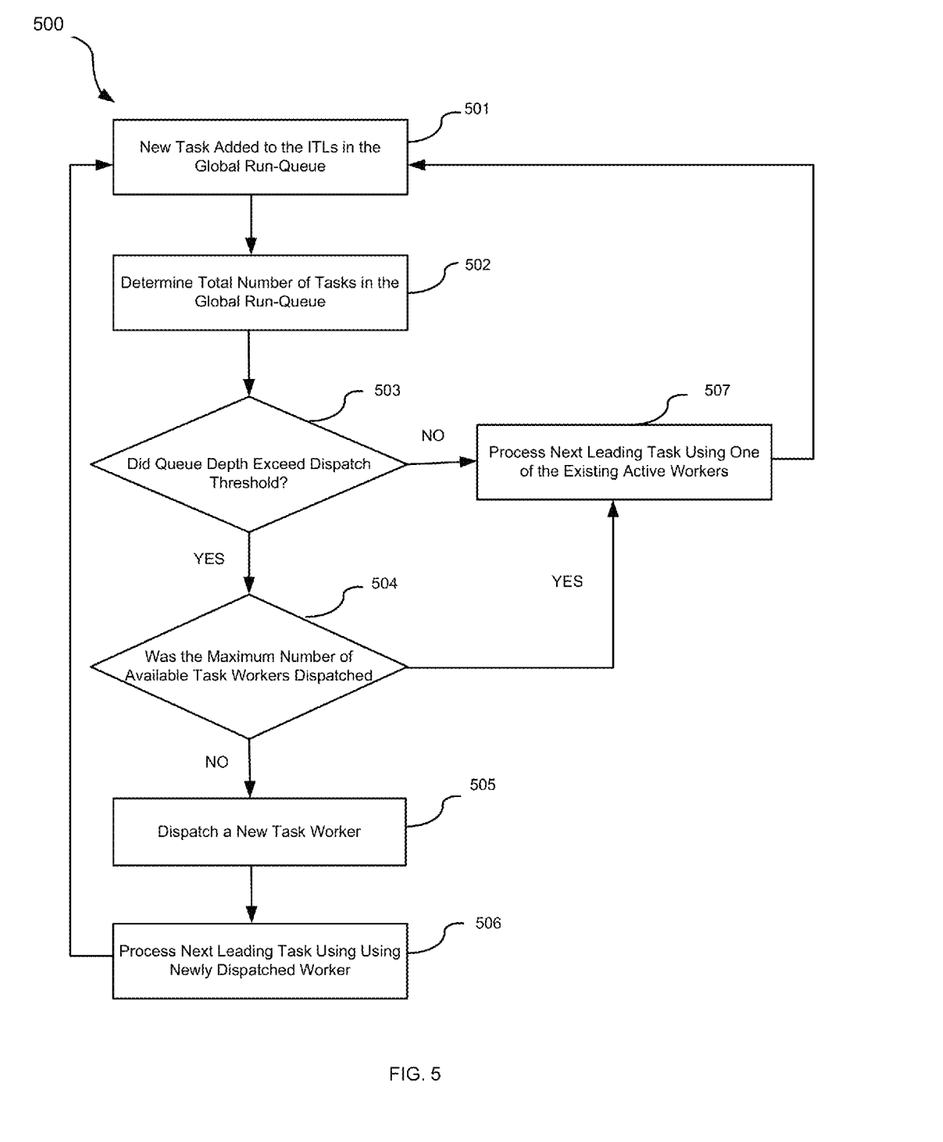
FIG. 5 is an exemplary flow diagram for dispatching task workers according to one embodiment.
Figure 6A:
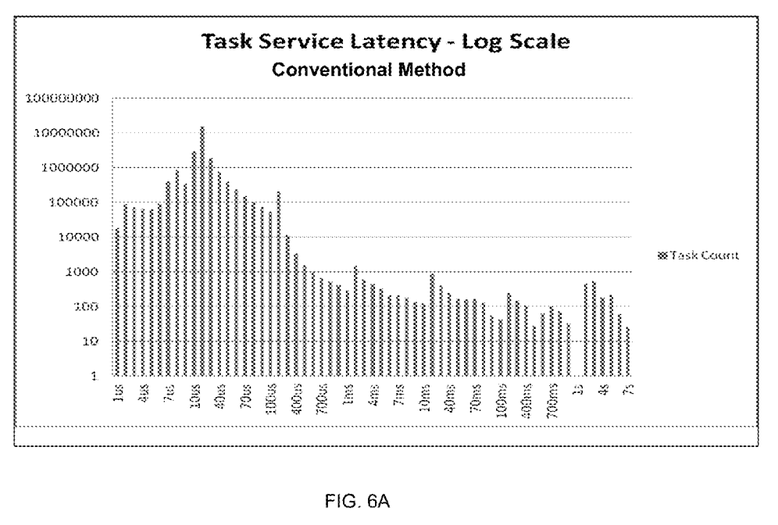
FIGS. 6A-6D include storage system performance data for processing tasks on a storage system according to the embodiments of the present disclosure.
Figure 6B:
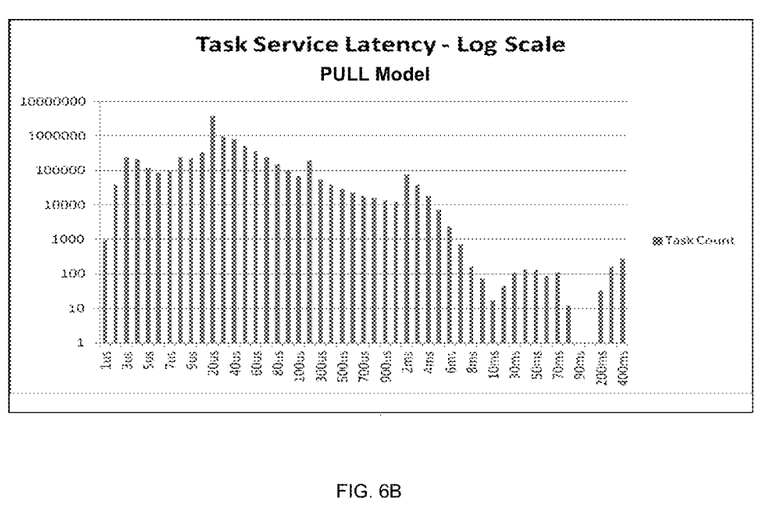
Figure 6C:
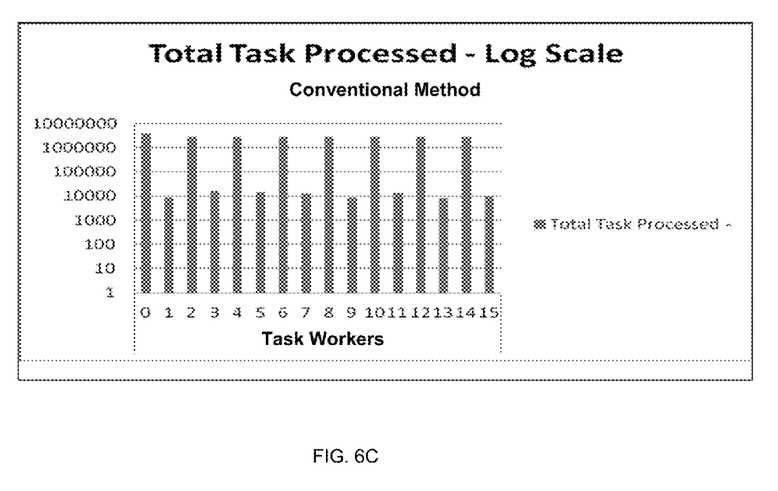
Figure 6D:
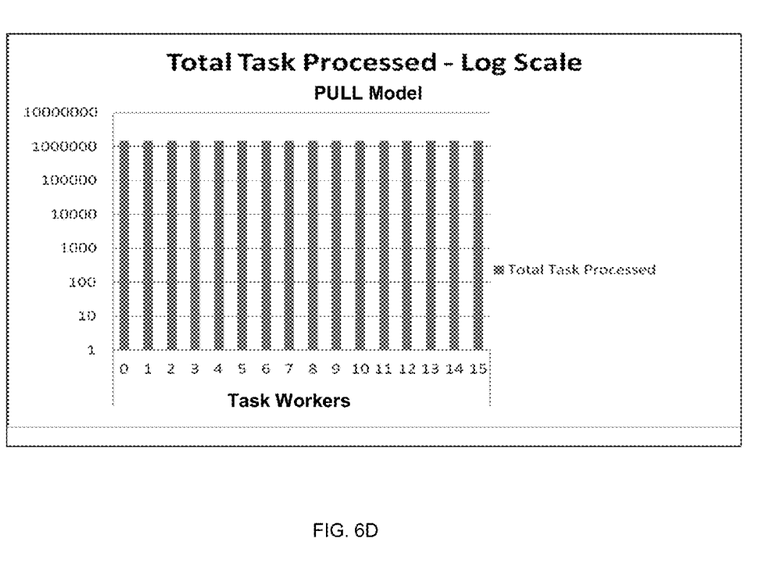

A shown in FIG. 5, tasks staged in the global run-queue can be processed by task workers that are dispatched based on the depth of the run-queue. In particular, a new task worker may be dispatched for a, very first created or active ITL task list, as well as based on the total number of tasks present in the global run-queue. To begin with, each time a new task is added to any of the ITLs located in the global run-queue (step 501) a total number of tasks in the global run-queue is determined (step 502). Based on the number of tasks in the global run-queue, as well as number of workers already dispatched for processing tasks, a decision is made if a new task worker may need to be dispatched. In particular, a dispatch threshold is used to determine if a new task worker(s) may need to be dispatched to process newly added tasks (step 503). If a new task worker(s) is/are need and the total number of active task workers does not exceed the maximum number of available task workers (step 504), a new task worker is dispatched (step 505) and next leading task in one of the ITL tasks lists located in the global run-queue is processed (step 506). If on the other hand a determination is made that no new task worker(s) need(s) to be dispatched or the maximum number of available task workers has been exceeded, the next leading task lists is processed by one of the already dispatched active worker (step 507).

In FIGS. 6A-6D task service latency and total task processed for the PULL model are compared to those obtained using conventional method. As can be seen in the FIGS. 6A and 6B task service latency can be significantly improved when leading tasks are pulled by generic task workers from a global-run queue as prescribed by the PULL model as compared to the conventional method. In particular, both shorter and more evenly distributed task service latencies are observed when the PULL model is used. Similarly, an improvement in a total task processed by any given task workers was achieved when tasks were pulled from the global run-queue as compared to the conventional method.

Figure 7:
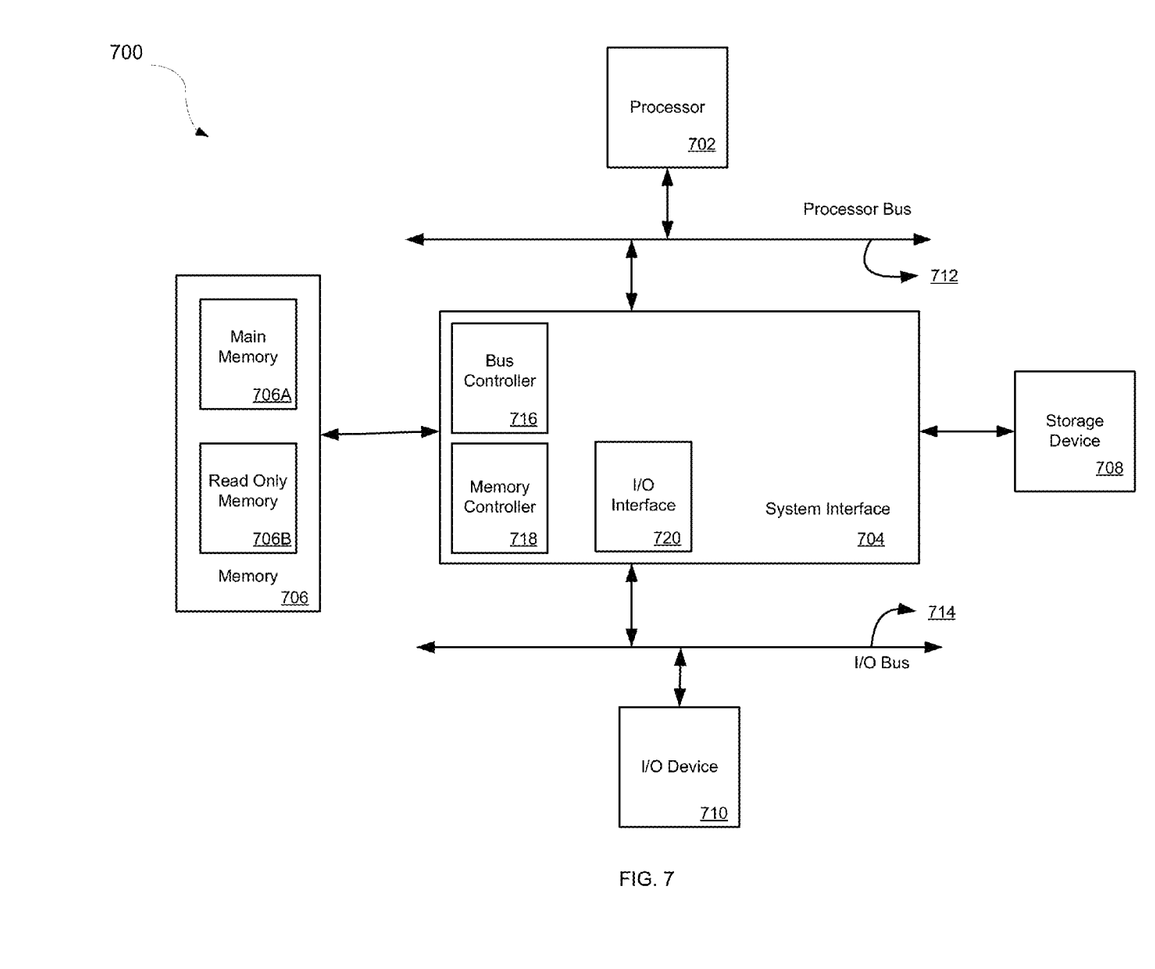
FIG. 7 is a block diagram illustrating an example of a computing system which may be used in implementing embodiments of the present disclosure.

FIG. 7 is a block diagram illustrating an example of a computing device or computer system 700 which may be used to implement the embodiments of a task processing disclosed above. As discussed herein embodiments of the present disclosure include various steps or operations which maybe performed by hardware components, software components or, in alternative embodiments, hardware components may be used in combination with the software instructions. According to the present example, the computing device or system 700 includes at least one processor 702, a system interface 704, a memory 706, a storage device 708 and at least one I/O device 710. The system 700 further includes a processor bus 712 and an input/output (I/O) bus 714.

Processor 702 may include one or more internal levels of cache (not shown) and can be any known processor. Processor bus 712, also known as the host bus or the front side bus, may be used to couple the processor 702 with the system interface 704. System interface 704 may be connected to the processor bus 712 to interface various components of the system with the processor 702. System interface 704 may, for example, include a bus controller 716 or bus interface unit to direct interaction with the processor bus 712 and a memory controller 718 for interfacing the memory 706 with the processor bus 712. System interface 704 may also include an I/O interface 720 to interface one or more I/O devices 710 with the processor 702.

Memory 706 typically includes one or more memory cards and control circuit (not shown). Memory 706 may include a main memory 706A and a read only memory (ROM) 706B. The main memory 706A can be Random Access Memory (RAM) or any other dynamic storage device(s) for storing information and instructions to be executed by the processor 702. Main memory 706A may be used for storing temporary variables or other intermediate information during execution of instructions by the processor 702. The read only memory 706B can be any static storage device(s) such as Programmable Read Only Memory (PROM) chip for storing static information and instructions for the processor.

According to one embodiment, the above methods may be performed by computer system 700 in response to processor 702 executing one or more sequences of one or more instructions contained in the main memory 706A. These instructions may be read into main memory 706A from another machine-readable medium capable of storing or transmitting information in a form (e.g., software, processing application) readable by a machine (e.g., a computer). Execution of the sequences of instructions contained in main memory 706A may cause processor 702 to perform the process steps described herein.

A machine-readable media may take the form of, but is not limited to, non-volatile media and volatile media. Non-volatile media may include a mass storage device 708 and volatile media may include dynamic storage devices. Common forms of machine-readable medium may include, but is not limited to, magnetic storage medium (e.g. floppy diskette); optical storage medium (e.g. CD-ROM), magneto-optical storage medium; read only memory (ROM); random access memory (RAM); erasable programmable memory (e.g., EPROM and EEPROM); flash memory; or other types of medium suitable for storing computer instructions.

Embodiments of the present disclosure include various steps, which are described in this specification. As discussed above, the steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various embodiments, it will be understood that these embodiments are illustrative and that the scope of the disclosure is not limited to them. Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternative, modifications, and variations together with all equivalents thereof.

The invention claimed is:

1. A task processing system comprising:
a host system including a plurality of initiator devices, wherein each of the plurality of the initiator devices includes at least one processor to generate a plurality of tasks; and
a storage array including at least one target port and at least one logical unit, a target system including at least one second processor to receive the plurality of tasks, the at least second processor operable to sort the plurality of tasks into a number of task lists, each task list of the number of task lists associated with a specific Initiator, Target, Logical Unit (ITL) nexus, the target system further operable to process a task from the plurality of tasks sorted into the number of task lists from each of the plurality of task lists prior to processing another task from the plurality of tasks sorted into the number of task lists from any of the plurality of task lists, wherein the tasks being processed may arrive at the target device nonsequentially,
the target system to process the tasks from each of the plurality of task lists by dispatching one or more task workers from a plurality of available task workers, and
wherein the task workers are dispatched using a dispatch threshold, with each additional task worker being dispatched every time the dispatch threshold is crossed, the dispatch threshold determined from a time attribute and a latency attribute, the time attribute relating to a task run time and the latency attribute relating to a worker dispatch latency.

2. The task processing system of claim 1, wherein the plurality of the initiator devices operate at different speeds, with a plurality of tasks from slower initiator devices from the plurality of tasks from the plurality of the initiator devices arriving at the target device after a plurality of tasks from faster initiator devices from the plurality of tasks from the plurality of the initiator devices, and wherein the tasks from the slower initiator devices and the faster initiator devices have a fair share of execution resources that is independent of the order in which the tasks arrive at the target device.

3. The task processing system of claim 1 wherein the system is further operable to process the one or more tasks from each of the plurality of task lists by dispatching one or more task workers, and wherein the plurality of task lists comprises a first task list and a second task list, the first task list including a first task and a second task, the second task list including a third task and a fourth task, and wherein a first task worker of the one or more or more task workers, processes the first task in the first task list followed by the one or more or more task workers, processes the first task in the first task list followed by the third task in the second task list, followed by the second task in the first task list and followed by the fourth task in the second task list.

4. The task processing system of claim 1 wherein the system is further operable to process the one or more tasks from each of the plurality of task lists by dispatching a first worker and a second worker, and wherein the plurality of task lists comprises a first task list, a second task list and a third task list, the first task list including a first task and a second task, the second task list comprising a third task and a fourth task, and the third task list including a fifth task, wherein the first task worker processes the first task in the first task list, the second task worker processes the third task in the second task list, and the first task worker or the second task worker next processes the fifth task in the third task list depending on whether the first task worker or the second task worker completes the processing of the first task or the second task.

5. The task processing system of claim 1, wherein a quantity of the plurality of available task workers corresponds to a quantity of cores available at the target system.

6. The task processing system of claim 5, wherein the task lists are chained together in a global run-queue accessible by the one or more task workers, whereby the one or more task workers may process the plurality of tasks from any of the task list in the global run-queue.

7. The task processing system of claim 6, wherein a quantity of task workers dispatched for processing tasks is based on a depth of the global run-queue, the depth of the global run-queue corresponding to a total quantity of tasks staged for processing in all of the plurality of task lists stored in the global run-queue.

8. The task processing system of claim 5 wherein the one or more task workers pull a leading task from each of the plurality of task lists in a round-robin fashion.

9. The task processing system of claim 5, wherein the dispatch threshold corresponds to a quantity of tasks that one or more task workers may process before an additional task worker is dispatched.

10. The task processing system of claim 1 wherein the storage array includes a server.

11. The task processing system of claim 1, wherein the dispatch threshold is determined by dividing the worker dispatch latency by the task run time, wherein the worker dispatch latency corresponds to a period between the time one task worker is dispatched until the time the task worker service routine is entered and the task run time corresponds to the time it takes for the one worker to process the task.

12. The task processing system of claim 1, wherein the dispatch threshold determined from a task service latency defined from when one task is staged in the queue to when the one task is processed by one task worker.

13. The task processing system of claim 1, wherein the dispatch threshold determined by dividing the time attribute by the latency attribute.

14. A task processing method comprising the steps of:
receiving a plurality of tasks from a plurality of initiator devices;
sorting received tasks into a plurality of task lists at a target device, each task list of the plurality of task lists associated with an Initiator, Target, Logical Unit (ITL) nexus; and
processing a leading task from each of the plurality of task lists prior to processing another task from any of the plurality of task lists, wherein the leading tasks being processed may arrive at the target device nonsequentially;
processing the leading tasks from each of the plurality of task lists by dispatching one or more task workers from a plurality of available task workers, and
dispatching the task workers using a dispatch threshold, with each additional task worker being dispatched every time the dispatch threshold is crossed, the dispatch threshold determined from a time attribute and a latency attribute, the time attribute relating to a task run time and the latency attribute relating to a worker dispatch latency.

15. The task processing method of claim 14, wherein the leading tasks from each of the task list are processed in round-robin fashion.

16. The task processing method of claim 14, wherein a total number of available task workers corresponds to a total number of processing cores at the target device.

17. The task processing method of claim 16 wherein the plurality of task lists are chained in a global run-queue, the global run-queue accessible by the one or more task workers, whereby the one or more task workers may process the plurality of tasks from any of the task list in the global run-queue.

18. The task processing method of claim 17 wherein the one or more task workers pull a leading task from each of the tasks list in the global run-queue in a round-robin fashion.

19. The task processing method of claim 18, wherein the dispatch threshold corresponding to a number of tasks that one or more task workers may process before an additional task worker is dispatched.

20. The task processing method of claim 17 wherein a total number of task workers dispatched for processing tasks in the task lists located in the global run-queue is determined based on the total number of tasks in the global run-queue.

21. The task processing method of claim 14, wherein the plurality of initiator devices operate at different speeds, with a plurality of tasks from slower initiator devices from the plurality of the initiator devices arriving at the target device after a plurality of tasks from faster initiator devices, and wherein the tasks from the slower initiator devices and the faster initiator devices have a fair share of execution resources that is independent of the order in which the tasks arrive at the target device.

22. The task processing method of claim 14, further comprising determining the dispatch threshold using a task service latency defined from when one task is staged in the queue to when the one task is processed by one task worker.

23. The task processing method of claim 14, further comprising determining the dispatch threshold by dividing the time attribute by the latency attribute.

* * * * *